(12) United States Patent
Lee et al.

(10) Patent No.: US 11,295,641 B2
(45) Date of Patent: Apr. 5, 2022

(54) WEARABLE ELECTRONIC DEVICE FOR CONTROLLING, ON BASIS OF REMAINING BATTERY CAPACITY, TRANSMITTANCE OF TRANSPARENT MEMBER AND OUTPUT LUMINANCE OF PROJECTOR, AND OPERATION METHOD

(71) Applicant: Samsung Electronics Co., Ltd., Suwon-si (KR)

(72) Inventors: Yunguk Lee, Suwon-si (KR); Goun Park, Suwon-si (KR); Jinchoul Lee, Suwon-si (KR); Seungnyun Kim, Suwon-si (KR); Yongsang Yun, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/250,451

(22) PCT Filed: Jul. 23, 2019

(86) PCT No.: PCT/KR2019/009063
§ 371 (c)(1),
(2) Date: Jan. 22, 2021

(87) PCT Pub. No.: WO2020/022734
PCT Pub. Date: Jan. 30, 2020

(65) Prior Publication Data
US 2021/0295751 A1   Sep. 23, 2021

(30) Foreign Application Priority Data

Jul. 23, 2018 (KR) .................. 10-2018-0085642

(51) Int. Cl.
*G09G 3/00* (2006.01)
*G06K 9/00* (2006.01)
(Continued)

(52) U.S. Cl.
CPC ......... *G09G 3/001* (2013.01); *G02B 27/0172* (2013.01); *G06K 9/00624* (2013.01);
(Continued)

(58) Field of Classification Search
USPC ........................................................ 345/207
See application file for complete search history.

(56) References Cited

U.S. PATENT DOCUMENTS

| 2001/0022651 A1* | 9/2001 | Kubota .................. G03B 21/10 |
| | | 353/94 |
| 2007/0127031 A1* | 6/2007 | Kang ..................... G09G 3/342 |
| | | 356/454 |

(Continued)

FOREIGN PATENT DOCUMENTS

| JP | 2004-243891 A | 9/2004 |
| JP | 2007-264324 A | 10/2007 |

(Continued)

OTHER PUBLICATIONS

International Search Report and Written Opinion of the International Searching Authority in connection with International Application No. PCT/KR2019/009063 dated Oct. 25, 2019, 12 pages.

*Primary Examiner* — Chineyere D Wills-Burns

(57) ABSTRACT

An electronic device is disclosed. The wearable electronic device, according to various embodiments, comprises: a battery; an illuminance sensor capable of measuring the brightness of the outside of the wearable electronic device; a transparent member capable of transmitting light incident from the outside; a light adjusting member arranged on at least one portion of the transparent member and capable of adjusting the transmittance of the incident light; a projector capable of outputting an image through the transparent member; and a processor, wherein the processor may be configured so as to measure the remaining capacity of the battery and the brightness of the outside, and when the (Continued)

remaining capacity is within a first predetermined range, adjust the transmittance to a first predetermined transmittance and adjust the output luminance of the projector to a first predetermined luminance on the basis of the brightness, and when the remaining capacity is within a second predetermined range, adjust the transmittance to a second predetermined transmittance and adjust the output luminance of the projector to a second predetermined luminance which is lower than the first predetermined luminance on the basis of the brightness. In addition, various embodiments may be provided.

13 Claims, 10 Drawing Sheets

(51) Int. Cl.
*G03B 21/14* (2006.01)
*H04N 9/31* (2006.01)
*G02B 27/01* (2006.01)

(52) U.S. Cl.
CPC .............. *G02B 2027/014* (2013.01); *G02B 2027/0118* (2013.01); *G09G 2320/0626* (2013.01); *G09G 2330/023* (2013.01); *G09G 2360/144* (2013.01)

(56) References Cited

U.S. PATENT DOCUMENTS

| | | |
|---|---|---|
| 2007/0188440 A1 | 8/2007 | Hwang et al. |
| 2012/0206443 A1* | 8/2012 | Kimura ............... G09G 3/3233 345/419 |
| 2013/0147859 A1* | 6/2013 | Kobayashi ........... G02B 27/017 345/690 |
| 2015/0070608 A1* | 3/2015 | Yoon .................... G09G 3/3655 349/33 |
| 2015/0355521 A1 | 12/2015 | Alton et al. |
| 2016/0214016 A1* | 7/2016 | Stafford .............. A63F 13/5255 |
| 2016/0223816 A1* | 8/2016 | Hue ..................... G02B 27/0172 |
| 2017/0045928 A1 | 2/2017 | Ishikawa et al. |
| 2018/0145283 A1* | 5/2018 | Hack ..................... G02F 1/0126 |
| 2018/0316376 A1 | 11/2018 | Kim et al. |

FOREIGN PATENT DOCUMENTS

| | | |
|---|---|---|
| JP | 2012-169726 A | 9/2012 |
| JP | 2015-156610 A | 8/2015 |
| JP | 2016-045814 A | 4/2016 |
| JP | 2017-520018 A | 7/2017 |
| KR | 10-0678968 B1 | 2/2007 |
| KR | 10-2017-0044963 A | 4/2017 |

\* cited by examiner

WEARABLE ELECTRONIC DEVICE FOR CONTROLLING, ON BASIS OF REMAINING BATTERY CAPACITY, TRANSMITTANCE OF TRANSPARENT MEMBER AND OUTPUT LUMINANCE OF PROJECTOR, AND OPERATION METHOD

CROSS-REFERENCE TO RELATED APPLICATIONS

This application is a National Phase Entry of PCT International Application No. PCT/KR2019/009063, which was filed on Jul. 23, 2019, and claims priority to Korean Patent Application No. 10-2018-0085642, which was filed on Jul. 23, 2018, the content of which is incorporated herein by reference.

BACKGROUND

1. Field

Various embodiments relate to a wearable electronic device and an operation method thereof.

2. Description of Related Art

Augmented reality (AR) is a technique for superimposing a three-dimensional (3D) (or two-dimensional (2D)) virtual image on an image or background of reality to display one image. An AR technique based on a hybrid of a real environment and a virtual object allows users to see the real environment to provide a better sense of reality and additional information.

In a wearable electronic device based on AR, an image provided through a projector is incident to an input grating surface through a prism. The user may then watch an image passing through an output grating surface with eyes.

SUMMARY

The wearable electronic device based on AR does not project an image, taking account of an ambient illuminance of a wearer and a viewpoint of the wearer. Thus, as the wearer goes out wearing the wearable electronic device, the user may have difficulty in recognizing an image when the ambient illuminance is high or an image being projected is dark.

According to various embodiments, there are provided a wearable electronic device and an operation method thereof, in which an environment and a viewpoint of a user are sensed through a sensor to improve visibility of an image being projected, and an output luminance of a projector and a transmittance are changed to a particular level or linearly, taking account of a battery power state, to minimize power consumption of a display.

A wearable electronic device according to various embodiments includes a battery, an illuminance sensor configured to measure a brightness of an outside of the wearable electronic device, a transparent member through which light incident from the outside passes, a light adjustment member disposed in at least a part of the transparent member and adjusting a transmittance with respect to the incident light, a projector configured to output an image through the transparent member, and a processor, in which the processor is configured to measure a remaining capacity of the battery and the brightness of the outside, to adjust the transmittance to a first predetermined transmittance and an output luminance of the projector to a first predetermined luminance, based on the brightness, when the remaining capacity falls within a first predetermined range, and to adjust the transmittance to a second predetermined transmittance and the output luminance of the projector to a second predetermined luminance that is less than the first predetermined luminance, based on the brightness, when the remaining capacity falls within a second predetermined range.

A method for controlling a wearable electronic device according to various embodiments includes measuring a remaining capacity of a battery and measuring a brightness of an outside, adjusting a transmittance of a transparent member through which light incident from an outside of the wearable electronic device passes to a first predetermined transmittance and an output luminance of the projector to a first predetermined luminance, based on the brightness, when the remaining capacity falls within a first predetermined range, and adjusting the transmittance to a second predetermined transmittance and the output luminance of the projector to a second predetermined luminance, based on the brightness, when the remaining capacity falls within a second predetermined range.

In a non-transitory computer-readable recording medium having recorded thereon a program to be executed on a computer, the program includes executable instructions that cause, when executed by a processor, the processor to measure a remaining capacity of a battery and a brightness of an outside, to adjust a transmittance of a transparent member through which light incident from an outside of the wearable electronic device passes to a first predetermined transmittance and an output luminance of the projector to a first predetermined luminance, based on the brightness, when the remaining capacity falls within a first predetermined range, and to adjust the transmittance to a second predetermined transmittance and the output luminance of the projector to a second predetermined luminance that is less than the first predetermined luminance, based on the brightness, when the remaining capacity falls within a second predetermined range.

According to various embodiments, visibility of contents and power consumption are improved based on a remaining battery capacity and an illuminance, and whether to display the contents on a display is determined based on occurrence of an event associated with an application to provide information to a user.

DETAILED DESCRIPTION

Figure 1:
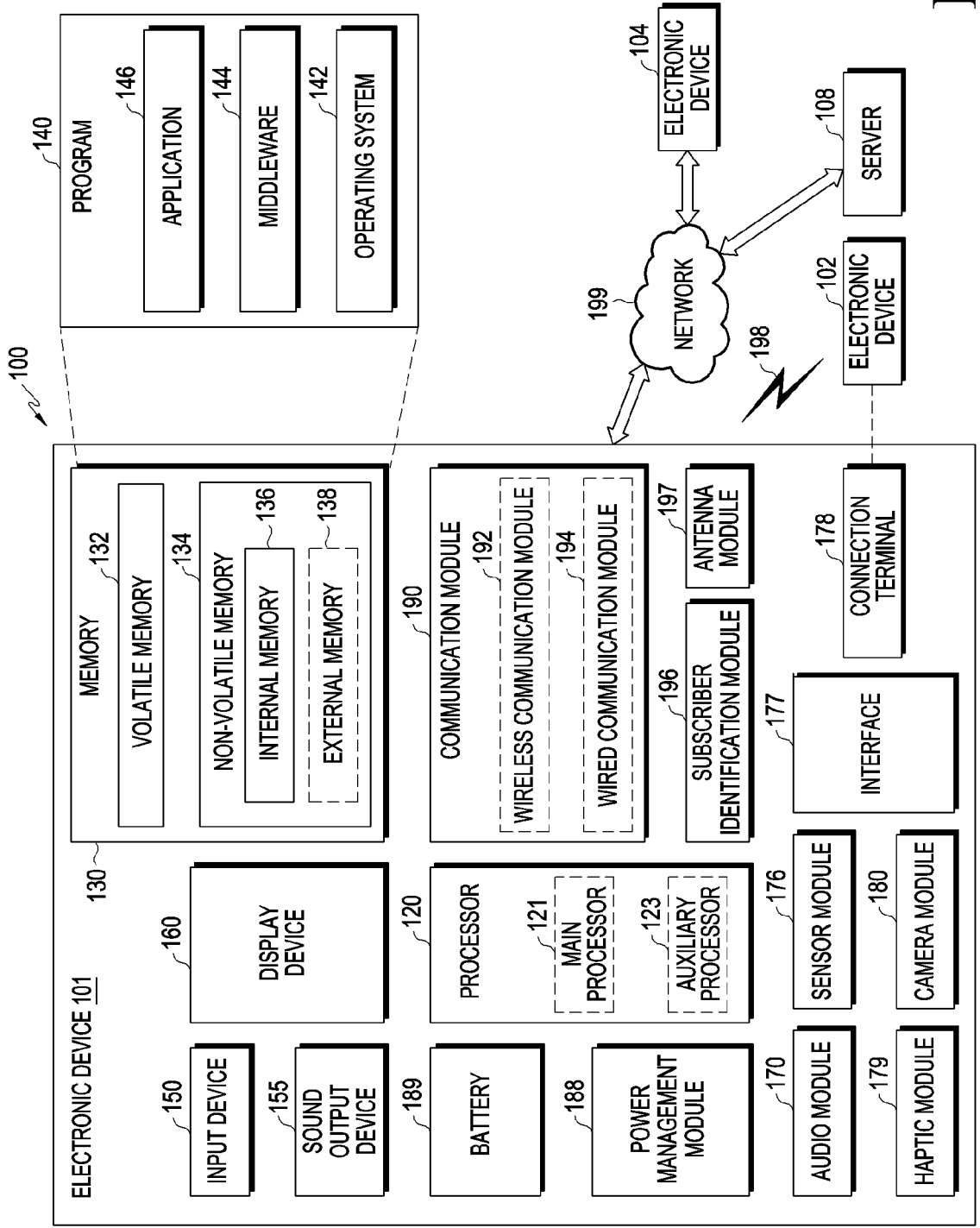
FIG. 1 illustrates a network environment including an electronic device to control image output using a transparent member based on a remaining battery capacity and an external brightness.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as a single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wireless-Fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). The antenna module may be formed with a conductor or a conductive pattern according to an embodiment, and may further include another part (e.g., a radio-frequency integrated circuit (RFIC)) in addition to a conductor or a conductive pattern according to some embodiment. According to an embodiment, the antenna module 197 may include one or more antennas, and, therefrom, at least one antenna appropriate for a communication scheme used in the communication network, such as the first network 198 or the second network 199, may be selected, for example, by the communication module 190. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
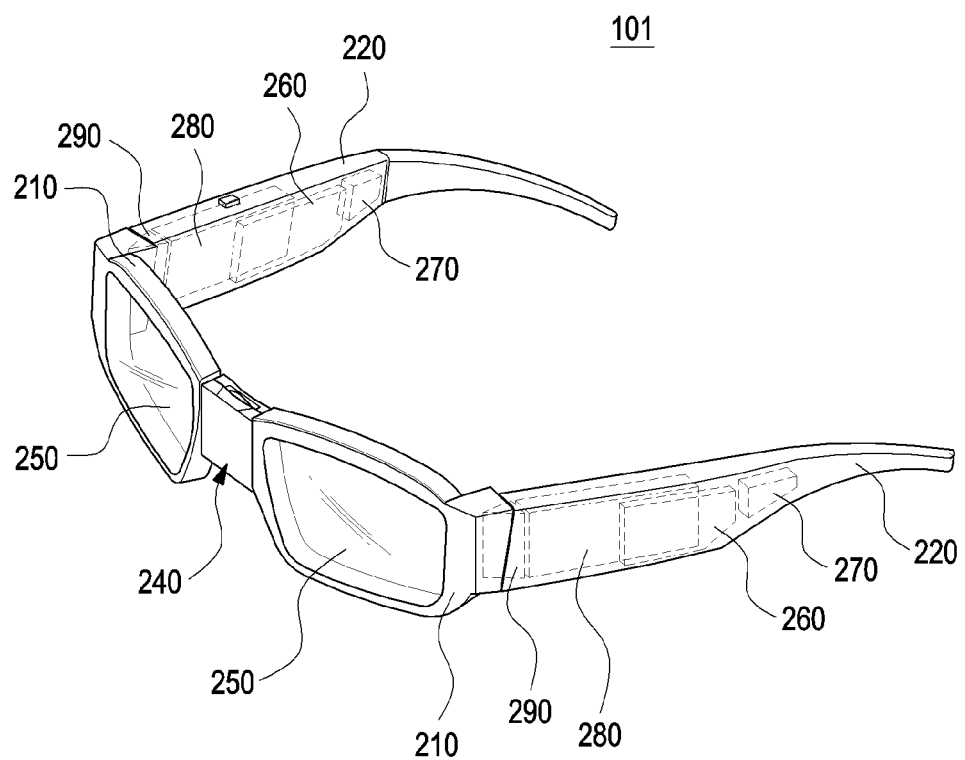
FIG. 2 is a perspective view of a wearable electronic device according to various embodiments of the disclosure.

FIG. 2 is a perspective view of a wearable electronic device 101 according to various embodiments of the present disclosure.

Referring to FIG. 2, the wearable electronic device 101 may include a pair of display devices 250 and a pair of housings 210. The pair of display devices 250 may be respectively mounted on the pair of housings 210 in a frame shape, a pair of wearing members 220 may extend in parallel to each other from the pair of housings 210, and the electronic device 101 may be a head-wearable type electronic device. The electronic device 101 may include an interval adjustment structure 240 that adjusts a length between the pair of housings 210 and a circuit board 260 and a battery 270 that are disposed in the wearing members 220. In another example, a light output device 280 (e.g., a projector), a light refraction module 290 (e.g., a prism), or a display module (not shown) may be included in the wearing member 220 of the electronic device 101. The structure of the electronic device 101 shown in FIG. 2 may be partially or entirely the same as the structure of the electronic device 101 shown in FIG. 1.

According to various embodiments, the display device 250 may include a display module, a projector, a sensor having a touch circuit mounted thereon, or the like, and a display of the display module may be a transparent or semi-transparent display. In another example, the display device 250 may include a window member (e.g., a transparent member) that may include a light adjustment member arranged in at least a part of the window member. The light adjustment member may be glass of a semi-transparent material or a member with a light transmittance that is adjusted based on adjustment of a coloring concentration. In another example, the display device 250 may include a lens including a waveguide, a reflective lens, etc., each of which may transmit light output from an output device to user's eyes.

According to various embodiments, the pair of housings 210 may have a form of a frame that at least partially surrounds an edge of each of the display devices 250 and may play a role of a rim of a glass structure including general sunglasses.

According to various embodiments, the circuit board 260 may be disposed on each of the pair of wearing members 220, and a circuit wire for connecting the circuit boards may be disposed inside or outside the pair of housings 210. The pair of wearing members 220 may extend in parallel with each other at opposite ends thereof, thereby providing a means for allowing the user to wear the electronic device 101 on a body, e.g., a head of the user. The pair of wearing members 220 may play a role of a temple of a structure of general glasses. For example, the pair of housings 210 may be positioned on a face of the user to position the display device 250 correspondingly to the user's eyes, such that the pair of wearing members 220 may be settled to the user's eyes in opposite sides of the head of the user.

According to various embodiments, when the circuit board 260, the battery 270, the light output device 280, and the light refraction module 290 are disposed, the pair of wearing members 220 may be used. For example, in each of the pair of wearing members 220, a housing structure capable of accommodating the circuit board 260, the battery 270, the light output device 280, or the light refraction module 290 may be provided. In another example, the electronic device 101 may include the circuit board 260, the battery 270, the light output device 280, and the light refraction module 290 in each of the pair of wearing members 220. In another example, the circuit board 260, the battery 270, the light output device 280, or the light refraction module 290 are disposed variously based on the weight distribution and wearing sensation of the electronic device 101.

According to an embodiment, the circuit board 260 may be configured in plural, one of which may be provided as a board including a driving circuit of the display device 250, a control circuit for coloring concentration adjustment, and a processor (e.g., the processor 120 of FIG. 1) for processing image information, etc. The processor 120 may measure a brightness of an outside of the wearable electronic device 101 by using an illuminance sensor (e.g., the sensor module 176 of FIG. 1). Alternatively, the processor 120 may control the light incident from the outside of the wearable electronic device 101 to pass through a transparent member. Alternatively, the processor 120 may also adjust a transmittance with respect to a light adjustment member. Alternatively, the processor 120 may output an image by using a projector. The above-described operations are exemplary, and the processor 120 may be configured to control in overall hardware mounted on the wearable electronic device 101, such as the driving circuit of the display device 250, the control circuit, etc. Another one of the plural circuit boards 260 may be provided as a circuit board on which an interface with the user, a communication circuit and various connectors for providing connection to another electronic device or a commercial communication network, and a sensor module (e.g., the sensor module 176 of FIG. 1) are mounted. As another example, a microphone or speaker phone for inputting and outputting sound may be disposed on or adjacent to one of the circuit boards 260. However, the circuit disposition of the circuit boards 260 and corresponding functions are not limited to the above-description, and may be adjusted variously depending on needs. For example, the sensor module may be disposed in each of the circuit boards 260.

According to an embodiment, the circuit boards 260 may be respectively disposed in any one of the wearing members 220. In another example, the sensor module 175 may include a proximity sensor, an illuminance sensor, a gyro sensor, a camera module, an eye tracker, a geomagnetic sensor, an accelerometer, etc., and various sensors constituting the sensor module 176 are not necessarily disposed in one of the circuit boards 260. For example, the camera module may be disposed at a proper position on the pair of housings 210 to approach the user's eyes. The sensor module 176 may detect information about an ambient environment required for setting an optimal use environment while monitoring the use environment of the electronic device 101, etc. For example, the illuminance sensor mounted in the sensor module 176 may detect an ambient illuminance and provide information required for adjusting a coloring concentration or brightness and a resolution of the display device 250.

According to an embodiment, the battery 270 may be disposed in plural, and may be disposed in at least one of the pair of wearing members 220 or may be respectively disposed in the wearing member 220, to supply power to the circuit board 260, the display module, etc.

According to an embodiment, the light output device 280 and the light refraction module 290 may be arranged in plural, and may be disposed in at least one or each of the pair of wearing members 220. The light emitted from the light output device 280 may reach the display device 250 after passing through the light refraction module 290. The electronic device 101 using the light output device 280 may be of a waveguide type or a reflective mirror type. For example, in the waveguide type, light emitted from a side light output device such as a projector may be reflected from a grating area formed in the display device b using a waveguide like a prism, etc., and is then transmitted to the user's eyes. In another example, in the reflective mirror type, the light emitted from the light output device may be directly reflected to the display device in front of the user's eyes to provide visual information to the user's eyes.

According to an embodiment, the circuit boards 260 disposed in each of the pair of housings 210 may be interconnected by a circuit wire (not shown). The circuit wire may provide a transmission/reception path of various control signals and data between the circuit boards. The circuit wire may be configured using a coaxial cable, and may have other various forms of transmission line structures such as a flexible printed circuit board (FPCB), etc.

According to an embodiment, the electronic device 101 may include an input device including a physical key, a touch pad, etc. For example, an input module such as a power key, a touch pad, etc., needs a user's direct contact thereto, and may be exposed to the outside of the electronic device 101.

Figure 3:
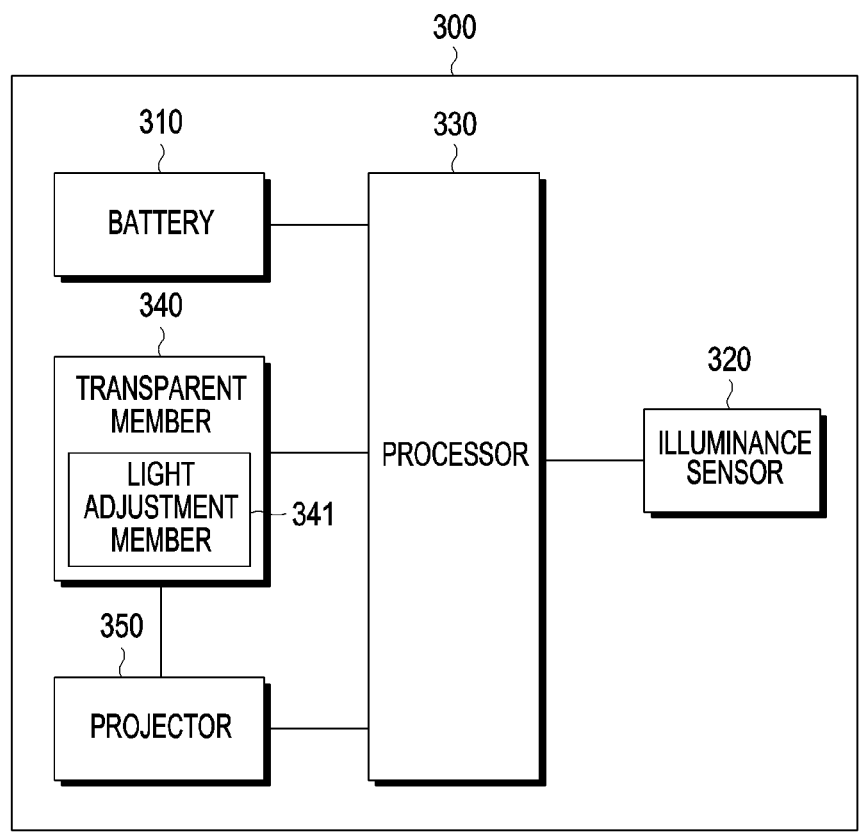
FIG. 3 is an exemplary block diagram of a structure of an electronic device according to various embodiments of the disclosure.
Figure 4:
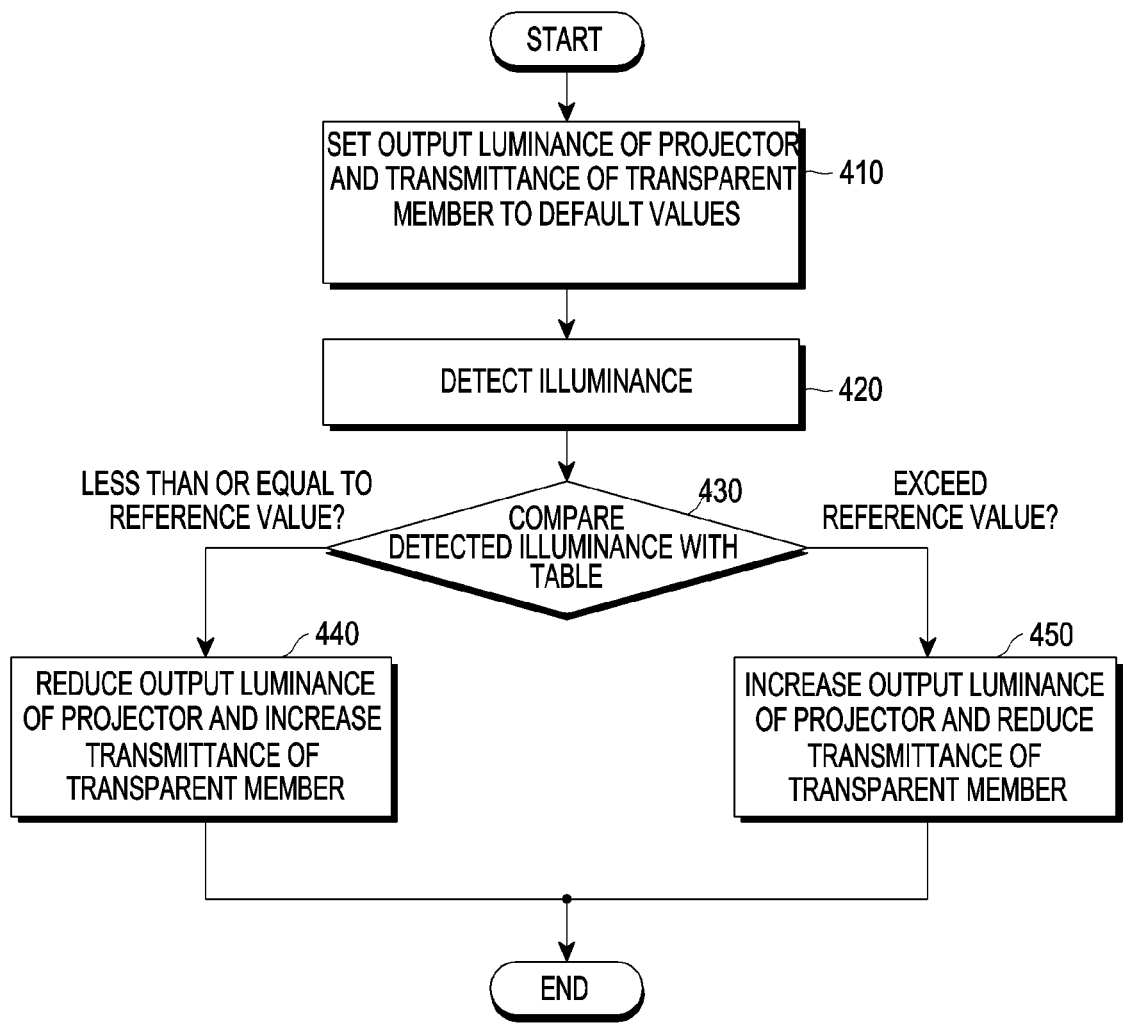
FIG. 4 is an exemplary flowchart illustrating an operation method of an electronic device according to various embodiments of the disclosure.

FIG. 3 is an exemplary block diagram of a structure of an electronic device according to various embodiments of the disclosure. FIG. 4 is an exemplary flowchart illustrating an operation method of an electronic device according to various embodiments of the disclosure.

A wearable electronic device 300 according to various embodiments (e.g., the electronic device 101 of FIG. 1) may include a battery 310 (e.g., the battery 270 of FIG. 2), an illuminance sensor 320, a processor 330 (e.g., the processor 120 of FIG. 1), a transparent member 340 (e.g., the window member of FIG. 2), a light adjustment member 341 disposed in at least a part of the transparent member 340, and a projector 350. The processor 330 may measure a brightness of an outside of the wearable electronic device 330 by using an illuminance sensor (e.g., the sensor module 176 of FIG. 1). Alternatively, the processor 330 may control the light incident from the outside of the wearable electronic device 300 to pass through a transparent member. Alternatively, the processor 330 may also adjust a transmittance with respect to a light adjustment member. Alternatively, the processor 330 may output an image by using a projector. The above-described operations are exemplary, and the processor 330 may be configured to control in overall hardware mounted on the wearable electronic device 300, such as the driving circuit of the display device 250, the control circuit, etc.

Referring to FIG. 4, in operation 410, the processor 330 (e.g., the processor 120 of FIG. 1) of the wearable electronic device 300 (e.g., the electronic device 101 of FIG. 1) may set an output luminance of a projector and a transmittance of a transparent member (not show, the window member of FIG. 2) through which light incident from the outside of the wearable electronic device may pass to default values. For example, the default values may be values that are set by the user or are previously predetermined. Referring to Table 1 provided below, the wearable electronic device 300 may store in a memory, a current value for displaying contents, which are configured based on visibility, on a display and the transmittance of the transparent member, with respect to an illuminance. For example, the processor 330 may set an illuminance (e.g., 500 Lux, 1000 Lux) of an office to a default value, and set a display current value to 150 mA and a transmittance of the transparent member to 50% with respect to the illuminance set to the default value. For example, as the illuminance is increased, the display current value may increase and the transmittance may be reduced, to improve the visibility of the contents to be displayed; as the illuminance is reduced, the display current value may be reduced and the transmittance may increase, to reduce unnecessary power consumption and thus lower total power consumption.

In operation 420, the processor 330 may detect the illuminance of the light incident from the outside of the wearable electronic device 300. In operation 430, the processor 330 may compare the detected illuminance with an illuminance of a table stored in the memory. The processor 330 may compare the detected illuminance with a reference value to identify the display current value for displaying the contents and the transmittance.

In operation 440, when the detected illuminance is less than the reference value as a result of comparison, the processor 330 may reduce the output luminance of the projector and increase the transmittance. For example, the processor 330 may reduce the display current of 150 mA set to the default value and increase the transmittance of 50%. For example, referring to Table 1 provided below, when the detected illuminance is 10 Lux, the display current may be set to 80 mA and the transmittance may be set to 90%. However, Table 1 provided below is merely an example, and may not limit the present disclosure. Moreover, according to various embodiments, the processor 330 may be configured to perform any one of an operation of reducing the output luminance of the projector or an operation of increasing the transmittance.

In operation 450, when the detected illuminance exceeds the reference value as a result of comparison, the processor 330 may reduce the transmittance while increasing the output luminance of the projector. For example, referring to Table 1 provided below, when the detected illuminance is 2000 Lux, the display current may increase to 170 mA and the transmittance may be reduced to 40%, thus increasing visibility of contents.

TABLE 1

| Illuminance (Lux) | Display Current (mA) | Transparent Member's Transmittance (%) |
|---|---|---|
| 0 | 25 | 100 |
| 1 | 25 | 100 |
| 2 | 26 | 100 |
| 3 | 27 | 100 |
| 4 | 28 | 100 |
| 5 | 30 | 100 |
| 6 | 40 | 100 |
| 7 | 50 | 100 |
| 8 | 60 | 100 |
| 9 | 70 | 95 |
| 10 | 80 | 90 |
| 15 | 90 | 90 |
| 20 | 100 | 80 |
| 25 | 110 | 80 |
| 50 | 120 | 70 |
| 100 | 130 | 70 |
| 300 | 140 | 70 |
| 500 | 150 | 50 |
| 1000 | 150 | 50 |
| 1500 | 160 | 45 |
| 2000 | 170 | 40 |
| 3000 | 180 | 35 |
| 4000 | 190 | 30 |
| 5000 | 200 | 25 |
| 10000 | 210 | 20 |
| 20000 | 220 | 19 |
| 30000 | 230 | 19 |
| 40000 | 250 | 18 |

Moreover, according to various embodiments, the processor 330 may be configured to perform any one of the operation of increasing the output luminance of the projector or the operation of reducing the transmittance.

Figure 5A:
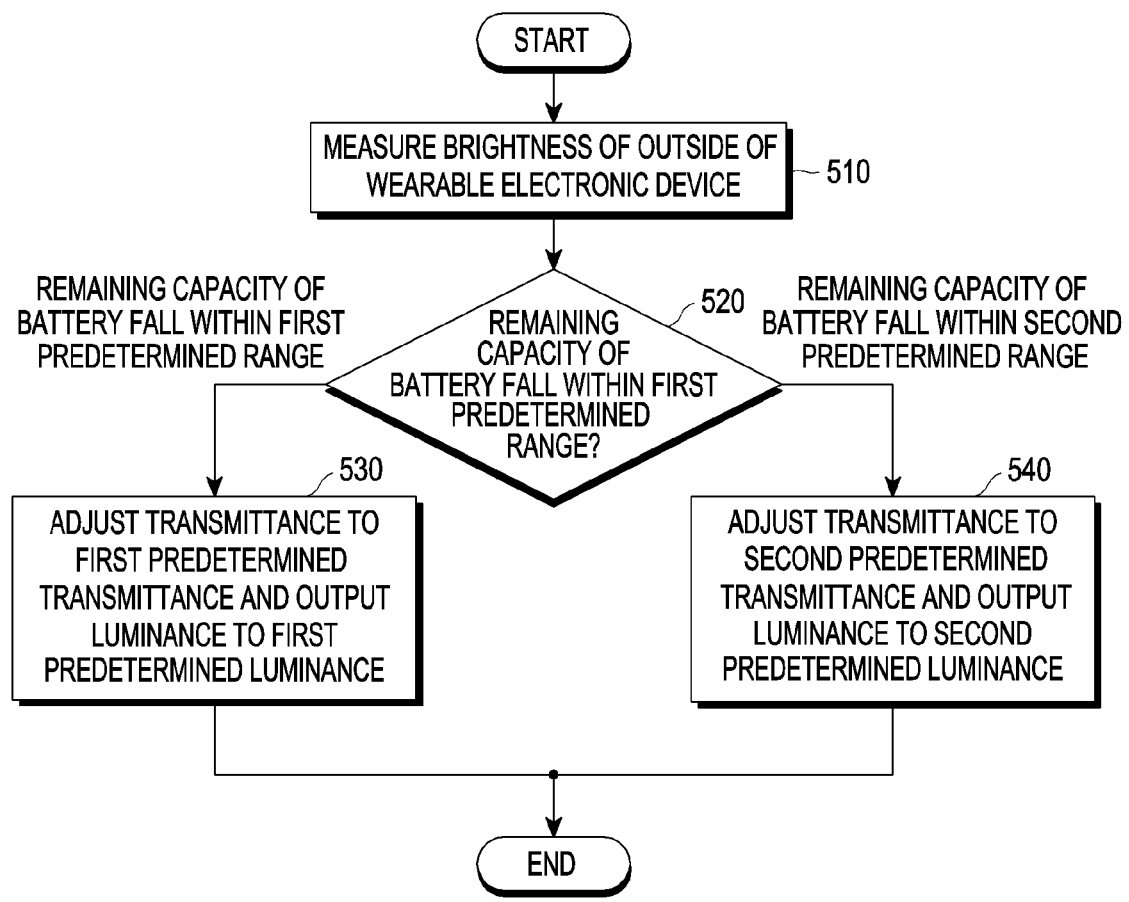
FIG. 5A is an exemplary flowchart in which an electronic device operates based on a remaining battery capacity. according to various embodiments of the disclosure.
Figure 5B:
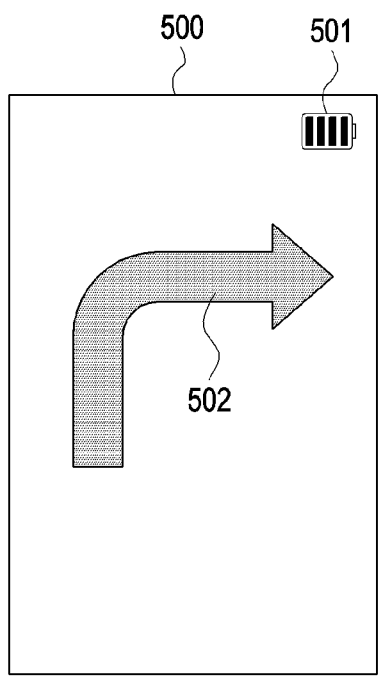
FIG. 5B is an exemplary diagram of a configuration in which an electronic device displays an object on a display based on a remaining battery capacity.
Figure 5C:
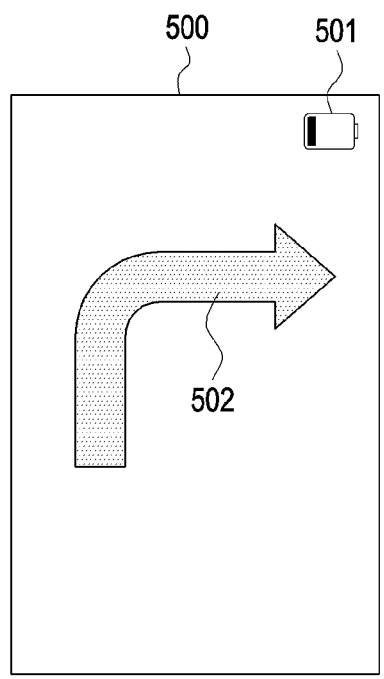
FIG. 5C is an exemplary diagram of a configuration in which an electronic device displays an object on a display based on a remaining battery capacity.

FIG. 5A is an exemplary flowchart in which an electronic device operates based on a remaining battery capacity. according to various embodiments of the disclosure. FIGS. 5B and 5C are exemplary diagrams of a configuration in which an electronic device displays an object on a display based on a remaining battery capacity.

In operation 510, a processor (e.g., the processor 120 of FIG. 1 or the processor 330 of FIG. 3) may measure the remaining capacity of a battery and measure the brightness of the outside of the wearable electronic device by using an illuminance sensor. The processor 330 may obtain an illuminance by measuring the brightness of the outside.

In operation 520, the processor 330 may determine whether the remaining capacity of the battery falls within a first predetermined range. The processor 330 may determine whether the remaining capacity of the battery falls within the first predetermined range, when the remaining capacity of the battery is greater than or equal to a threshold value. When the remaining capacity of the battery is greater than or equal to the threshold value, the processor 330 may control the wearable electronic device (e.g., the electronic device 101 of FIG. 1) to operate in a normal mode; when the remaining capacity of the battery is less than or equal to the threshold value, the processor 330 may control the wearable electronic device to operate in a low-power mode. The processor 330 may reduce power consumption by lowering the display current and increasing the transmittance of the transparent member, when the wearable electronic device (e.g., the wearable electronic device 101 of FIG. 1 or the wearable electronic device 300 of FIG. 3) operates in the low-power mode.

In operation 530, the processor 330 may adjust the transmittance to a first predetermined transmittance and an output luminance of the projector to a first predetermined luminance, based on the brightness outside the wearable electronic device, when the remaining capacity falls within a first predetermined range. When the remaining capacity falls within the first predetermined range, the processor 330 may adjust the output luminance of the projector and the transmittance based on an illuminance of the brightness by using Table 1. Referring to FIG. 5B, the processor 330 may display that the remaining capacity of the battery falls within the first predetermined range through a first object 501 displayed on a display 500 (e.g., the display device 160 of FIG. 1), when the remaining capacity of the battery falls within the first predetermined range. For example, the first object 501 may be an object indicating the remaining capacity of the battery. When the remaining capacity of the battery falls within the first predetermined range, the processor 330 may display a second object 502 based on the detected illuminance using Table 1. For example, referring to Table 1, when the remaining capacity of the battery falls within the first predetermined range and the illuminance is 500 Lux, the processor 330 may adjust the display current to 150 mA and the transmittance of the transparent member to 50% to display objects. The numerical values of the display current and the transmittance described using Table 1 are merely examples, and the present disclosure is not limited by the foregoing numerical values.

In operation 540, the processor 330 may adjust the transmittance to a second predetermined transmittance and the output luminance of the projector to a second predetermined luminance, which is less than the first predetermined luminance, based on the brightness outside the wearable electronic device, when the remaining capacity falls within a second predetermined range. When the remaining capacity falls within the second predetermined range in which the remaining capacity is less than or equal to the threshold value, the processor 330 may adjust the output luminance of the projector and the transmittance based on the illuminance of the brightness by using Table 2 provided below. Referring to FIG. 5C, the processor 330 may display that the remaining capacity of the battery falls within the second predetermined range through the first object 501 displayed on the display 500 (e.g., the display device 160 of FIG. 1), when the remaining capacity of the battery falls within the second predetermined range. For example, the first object 501 may be an object indicating the remaining capacity of the battery. When the remaining capacity of the battery falls within the second predetermined range, the processor 330 may display the second object 502 based on the detected illuminance using Table 2. The second object 502 in which the remaining capacity of the battery is displayed within the second predetermined range may be displayed in a state where the output luminance of the projector is less and the transmittance of the transparent member is greater than with the second object 502 of FIG. 5B in which the remaining capacity of the battery is displayed within the first predetermined range. For example, referring to Table 1, when the remaining capacity of the battery falls within the first predetermined range and the illuminance is 500 Lux, the processor 330 may adjust the display current to 1000 mA and the transmittance of the transparent member to 70%. The numerical values of the display current and the transmittance described using Table 2 are merely examples, and the present disclosure is not limited by the foregoing numerical values.

TABLE 2

| Lux | Display Current (mA) | Transparent Member's Transmittance (%) |
| --- | --- | --- |
| 0 | 25 | 100 |
| 5 | 26 | 100 |
| 10 | 30 | 90 |
| 50 | 60 | 70 |
| 100 | 70 | 70 |
| 500 | 100 | 50 |
| 1000 | 100 | 50 |
| 5000 | 140 | 25 |
| 20000 | 180 | 19 |
| 40000 | 210 | 18 |

That is, the wearable electronic device 300 according to various embodiments may store a table (e.g., Table 2) for reference to a case with the low-power mode and a table (e.g., Table 1) for reference to a case with the normal mode.

Figure 6:
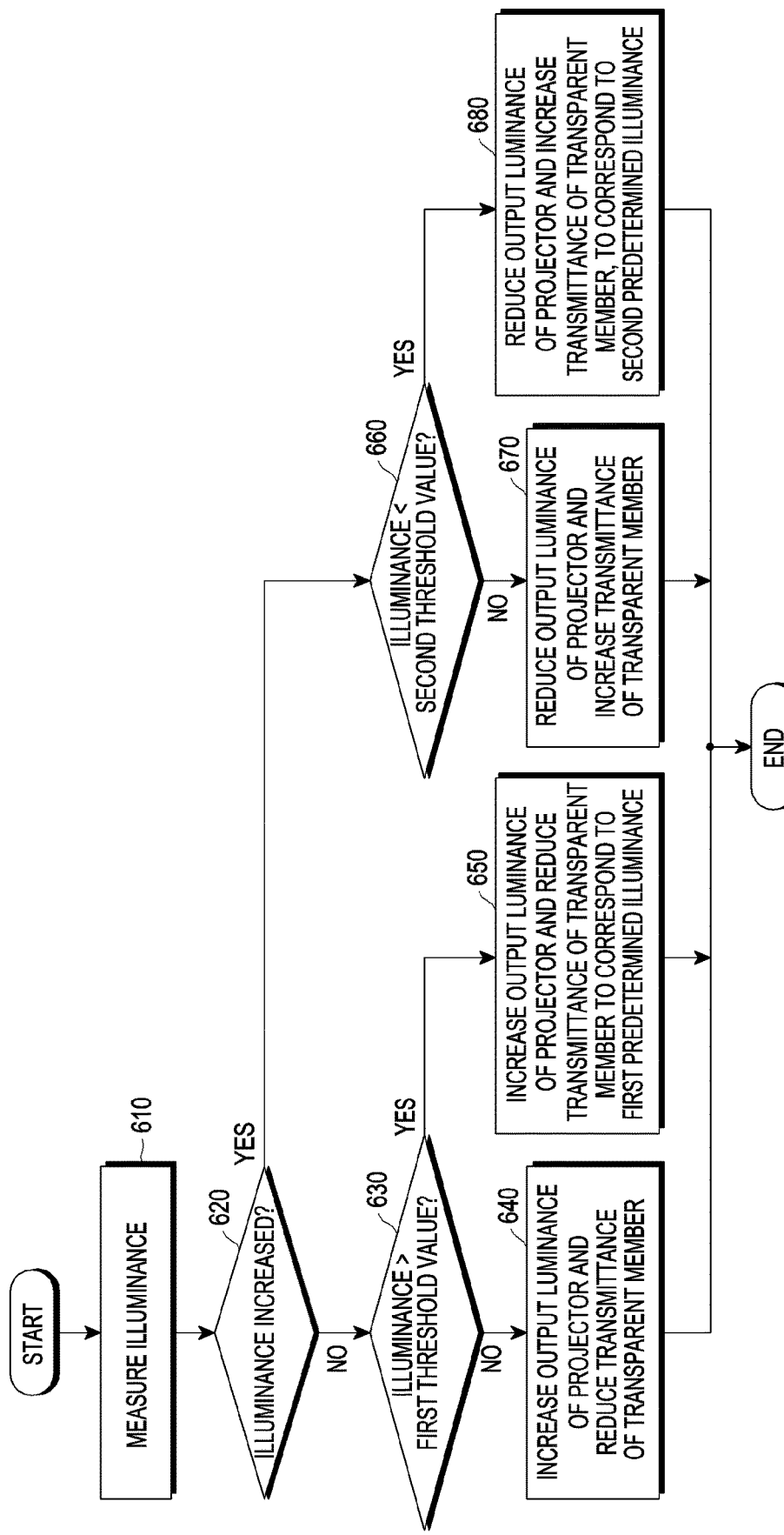
FIG. 6 is an exemplary flowchart in which an electronic device operates based on a change in an illuminance, according to various embodiments of the disclosure.

FIG. 6 is an exemplary flowchart in which an electronic device operates based on a change in an illuminance, according to various embodiments of the disclosure.

In operation 610, the processor 330 (e.g., the processor 120 of FIG. 1) may measure an illuminance of the outside of the wearable electronic device by using the illuminance sensor 320. In operation 620, the processor 330 may determine whether the illuminance is increased. In operation 630, when determining that the illuminance is increased, using the illuminance sensor, the processor 330 may determine whether the increased illuminance exceeds a first threshold value. The processor 330 may set (e.g., refer to) a plurality of threshold values (e.g., a first threshold value and a second threshold value) in relation to the illuminance. For example, the first threshold value may be set greater than the second threshold value. When the illuminance is unnecessarily high (e.g., exceeds the first threshold value), the processor 330 may increase the display current (increase the output luminance of the projector) and reduce the transmittance of the transparent member; when the illuminance is unnecessarily low (e.g., is less than the second threshold value), the processor 330 may reduce the display current (reduce the output luminance of the projector) and increase the transmittance of the transparent member, thereby reducing fatigue of the eyes of the user or improving the visibility of contents to be displayed.

In operation 640, when the increased illuminance is less than or equal to the first threshold value, the processor 330 may increase the output luminance of the projector and reduce the transmittance of the transparent member, to correspond to the increased illuminance. For example, the processor 330 may increase the output luminance of the projector and reduce the transmittance of the transparent member according to an illuminance table of Table 1 based on the increased illuminance.

In operation 650, when the increased illuminance exceeds the first threshold value, the processor 330 may increase the output luminance of the projector and reduce the transmittance of the transparent member, to correspond to a first predetermined illuminance. When the increased illuminance exceeds the first threshold value, the processor 330 may determine that the illuminance of an excessive brightness is detected in the wearable electronic device, further increase the display current to be greater than the display current corresponding to the illuminance based on the illuminance table, and further reduce the transmittance of the transparent member, thereby reducing the fatigue of the eyes of the user.

In operation 660, when the illuminance is reduced, the processor 330 may determine whether the reduced illuminance is less than the second threshold value. When the reduced illuminance is greater than or equal to the second threshold value, the processor 330 may reduce the output luminance of the projector to correspond to the reduced illuminance while increasing the transmittance of the transparent member in operation 670. For example, the processor 330 may reduce the output luminance of the projector and increase the transmittance of the transparent member according to the illuminance table of Table 1 based on the reduced illuminance.

When the reduced illuminance is less than or equal to the second threshold value, the processor 330 may reduce the output luminance of the projector and increase the transmittance of the transparent member, to correspond to the second predetermined illuminance, in operation 680. Alternatively, the processor 330 may adjust the transmittance of the transparent member to 100%. When the reduced illuminance is less than or equal to the second threshold value, the processor 330 may detect that the illuminance of a brightness applied to the wearable electronic device is unnecessarily low, further reduce the display current to be less than the display current corresponding to the illuminance based on the illuminance table, and further increase the transmittance of the transparent member, thereby reducing consumed power required for displaying the contents.

Figure 7:
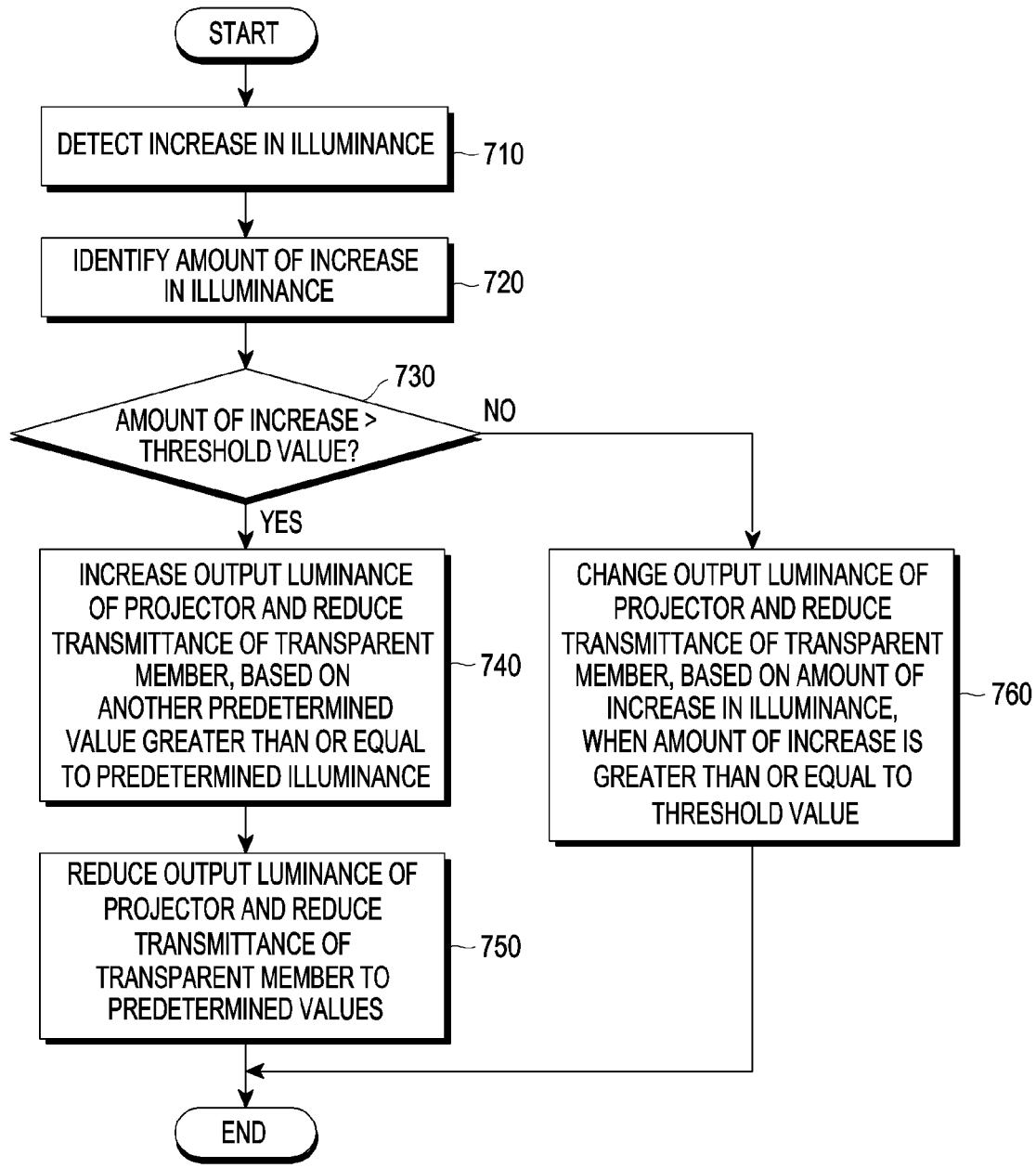
FIG. 7 is an exemplary flowchart in which an electronic device operates based on a change in an illuminance, according to various embodiments of the disclosure.

FIG. 7 is an exemplary flowchart in which a wearable electronic device operates based on a change in an illuminance, according to various embodiments of the disclosure.

In operation 710, a processor (e.g., the processor 120 of FIG. 1 or the processor 330 of FIG. 3) may detect an increase in an illuminance by using an illuminance sensor. In operation 720, the processor 330 may identify the amount of increase in an illuminance. In operation 730, the processor 330 may determine whether the amount of increase in an illuminance exceeds a threshold value. For example, the processor 330 may identify an illuminance with respect to a brightness of the outside of the wearable electronic device by using the illuminance sensor, and when the illuminance is increased, the processor 330 may identify the increased illuminance and determine whether the amount of increase in the illuminance exceeds a threshold value.

In operation 740, when the increased illuminance exceeds the threshold value, the processor 330 may increase the output luminance of the projector based on another predetermined illuminance that is greater than or equal to a predetermined illuminance, and reduce the transmittance of the transparent member. For example, the processor 330 may increase the output luminance of the projector and reduce the transmittance of the transparent member using the output luminance of the projector and the transmittance of the transparent member based on the illuminance prior to the illuminance being increased. In operation 750, the processor 330 may reduce the output luminance of the projector and increase the transmittance of the transparent member to predetermined values. The processor 330 may determine the predetermined illuminance and another predetermined illuminance that is greater than or equal to the predetermined illuminance. When determining that an increase in the illuminance, which is greater than or equal to the threshold value, occurs, the processor 330 may increase the output luminance of the projector and reduce the transmittance of the transparent member, based on another predetermined illuminance that is greater than the predetermined illuminance, thereby improving the visibility of the contents and preventing the light of an excessive brightness from being applied to the user's eyes. When the output luminance of the projector is increased and the transmittance of the transparent member is reduced, based on another predetermined illuminance that is greater than the predetermined illuminance, the processor 330 may reduce the output luminance of the projector and gradually increase the transmittance to operate with the output luminance of the projector and the transmittance of the transparent member based on the predetermined illuminance.

In operation 760, when the amount of increase exceeds the threshold value, the processor 330 may change the output luminance of the projector and the transmittance of the transparent member based on the amount of increase. For example, when the amount of increase is less than or equal to the threshold value, the processor 330 may change the output luminance of the projector and the transmittance of the transparent member based on the amount of increase in the illuminance by using Table 1. For example, the processor 330 may increase the output luminance of the projector and reduce the transmittance of the transparent member.

Figure 8:
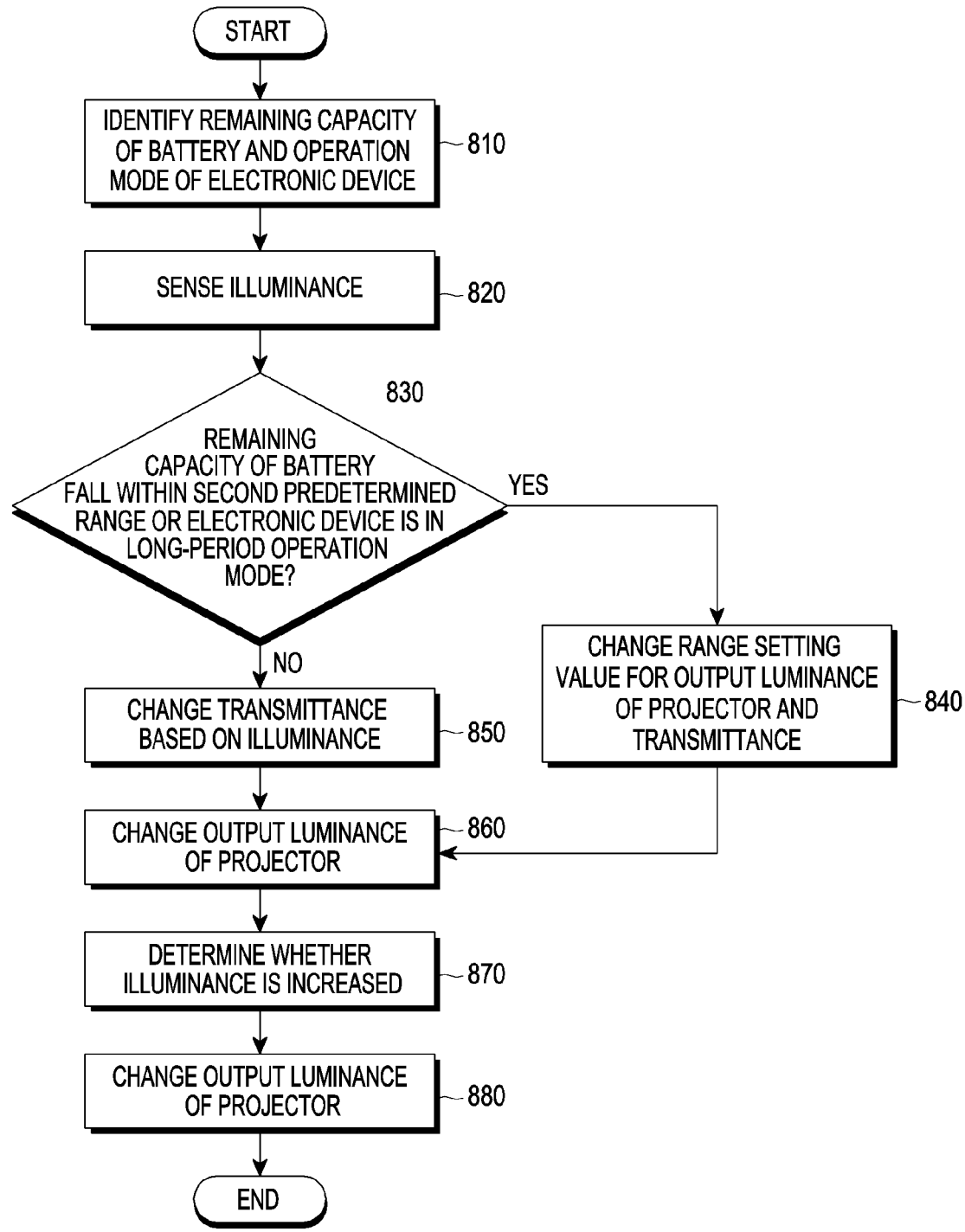
FIG. 8 is an exemplary flowchart in which an electronic device operates based on a remaining battery capacity and an illuminance, according to various embodiments of the disclosure.

FIG. 8 is an exemplary flowchart in which a wearable electronic device operates based on a remaining battery capacity and an illuminance, according to various embodiments of the disclosure.

In operation 810, a processor (e.g., the processor 120 of FIG. 1 or the processor 330 of FIG. 3) of the wearable electronic device (e.g., the electronic device 101 of FIG. 1 or the wearable electronic device 300 of FIG. 3) may identify the remaining capacity of the battery and the operation mode of the wearable electronic device. The operation mode of the wearable electronic device 300 may include a long-period operation mode meaning whether the wearable electronic device 300 continuously operates for a long time, a low-power mode in which the remaining capacity of the battery falls within the second predetermined range, a normal mode in which the remaining capacity of the battery falls within the first predetermined range, etc.

In operation 820, the processor 330 may identify an illuminance with respect to a brightness of the outside of the wearable electronic device. The processor 330 may identify the illuminance with respect to the brightness of the outside of the wearable electronic device, by using the illuminance sensor.

In operation 830, the processor 330 may determine whether the remaining capacity of the battery corresponds to the second predetermined range or the wearable electronic device 300 is in the long-period operation mode. The processor 330 may determine that the wearable electronic device 300 needs to operate in the low-power mode when the remaining capacity of the battery falls within the second predetermined range and is less than or equal to the threshold value. Alternatively, when the wearable electronic device enters the long-period operation mode, e.g., when the wearable electronic device continuously operates for a predetermined period of time, the processor 330 may determine that the output luminance of the projector and the transmittance of the transparent member need to be changed.

In operation 840, when the remaining capacity of the battery falls within the second predetermined range or the wearable electronic device 300 operates in the long-period operation mode, the processor 330 may change a range setting value for the output luminance of the projector and the transmittance of the transparent member. For example, the processor 330 may adjust the output luminance of the projector and the transmittance of the transparent member by using the illuminance table of Table 1 in the normal mode, and change the output luminance of the projector and the transmittance of the transparent member to corresponding to the illuminance based on the illuminance table of Table 2 when determining that the remaining capacity of the battery falls within the second predetermined range or the wearable electronic device is in the long-period operation mode.

In operation 850, when the remaining capacity of the battery does not fall within the second predetermined range or the wearable electronic device is not in the long-period operation mode, or when the remaining capacity of the battery does not fall within the second predetermined range and the wearable electronic device is not in the long-period operation mode, the processor 330 may change the transmittance of the transparent member according to the illuminance, and in operation 860, the processor 330 may change the output luminance of the projector. For example, the processor 330 may adjust the output luminance (adjust the display current) of the projector and adjust the transmittance of the transparent member based on the illuminance by using the illuminance table of Table 1.

In operation 870, the processor 330 may determine whether the illuminance is increased. In operation 880, the processor 330 may change the output luminance of the projector based on whether the illuminance is increased. For example, when the illuminance is increased, the processor 330 may increase the output luminance of the projector and reduce the transmittance of the transparent member; when the illuminance is reduced, the processor 330 may reduce the output luminance of the projector and increase the transmittance of the transparent member.

Figure 9:
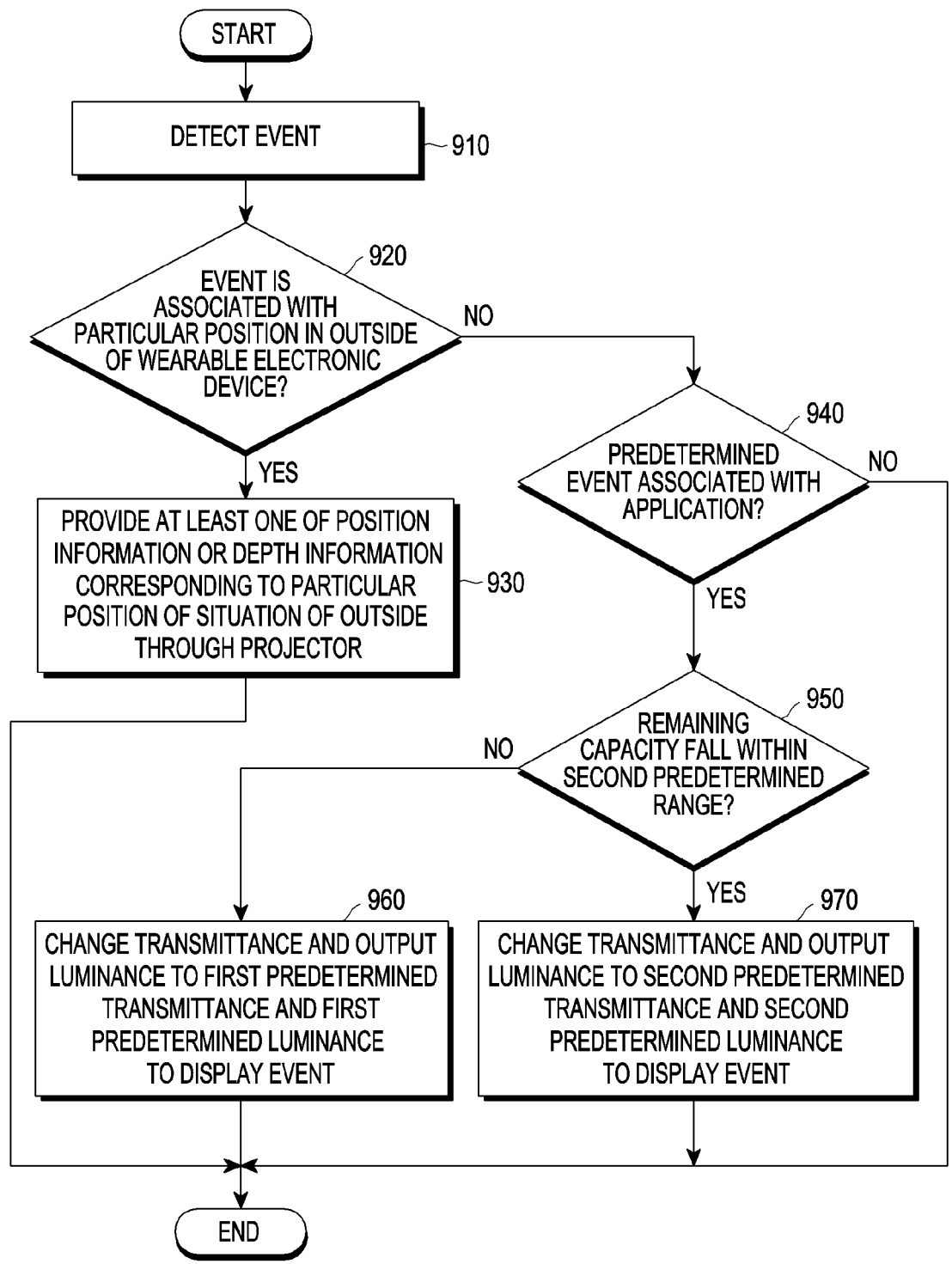
FIG. 9 is an exemplary flowchart in which an electronic device operates based on an event, according to various embodiments of the disclosure.

FIG. 9 is an exemplary flowchart in which a wearable electronic device operates based on an event, according to various embodiments of the disclosure.

In operation 910, the processor 330 may identify an event associated with the wearable electronic device 300 (e.g., the electronic device 101 of FIG. 1). For example, the event may include an event associated with a particular position in the outside of the wearable electronic device 300 or an event associated with an application stored in a memory of the wearable electronic device 300. Alternatively, the wearable electronic device 300 may receive an event associated with the wearable electronic device 300 from the external electronic device 104 or the server 108. For example, the server 108 may be a server associated with the application stored in the memory of the wearable electronic device 300. The event associated with the application may include a general event and a predetermined event requesting display to the user including urgent information.

In operation 920, the processor 330 may determine whether the event is an event associated with the particular position in the outside of the wearable electronic device 300. In operation 930, when the event is the event associated with the particular position in the outside of the wearable electronic device, the processor 330 may provide at least one of position information or depth information corresponding to the particular position in a situation of the outside through a projector. The processor 330 may display the event at the particular position in the outside of the wearable electronic device 300 and provide at least one of position information or depth information corresponding to the event by displaying the same on the display through a projector.

According to various embodiments, the processor 330 may determine whether the remaining capacity of the battery falls within the second predetermined range. When the remaining capacity of the battery falls within the second predetermined range, the processor 330 may adjust the output luminance of the projector and the transmittance of the transparent member to a second predetermined output luminance of the projector and a second predetermined transmittance of the transparent member. For example, when the output luminance of the projector and the transmittance of the transparent member are adjusted to the second predetermined output luminance of the projector and the second predetermined transmittance of the transparent member, upon detection of the event associated with the particular position in the outside of the wearable electronic device, the processor 330 may adjust the output luminance of the projector and the transmittance of the transparent member to display the event. For example, the processor 330 may increase the output luminance of the projector and reduce the transmittance of the transparent member, thereby improving the visibility of the contents to be displayed.

In operation 940, the processor 330 may determine whether the detected event is a predetermined event associated with an application. The predetermined event may be an event required to be immediately displayed to the user, including urgent information. The processor 330 may sort a normal event and an urgent event. For example, the urgent event may include various events such as an emergency text, call reception in a phone application, etc., and may be directly set by the user without being limited to these examples. In operation 950, the processor 330 may determine whether the remaining capacity of the battery falls within the second predetermined range. When the remaining capacity of the battery falls within the second predetermined range, the processor 330 may change the output luminance of the projector and the transmittance of the transparent member to the second predetermined output luminance of the projector and the second predetermined transmittance of the transparent member, to display the event in operation 970. Alternatively, regardless of the remaining capacity of the battery, the processor 330 may identify a predetermined event associated with the application stored in the memory and change the output luminance of the projector and the transmittance of the transparent member to the second predetermined output luminance of the projector and the second predetermined transmittance of the transparent member at least based on information associated with the event, to display the information associated with the event through the projector. When the output luminance of the projector and the transmittance of the transparent member are adjusted to the second predetermined output luminance of the projector and the second predetermined transmittance of the transparent member, upon detection of the predetermined event associated with the application, the processor 330 may adjust the output luminance of the projector and the transmittance of the transparent member to display the event. For example, the processor 330 may increase the output luminance of the projector and reduce the transmittance of the transparent member, thereby improving the visibility of the contents to be displayed. When the remaining capacity of the battery falls within the second predetermined range, the processor 330 may not display the event upon detection of the normal event rather than the predetermined event.

When the remaining capacity of the battery does not fall within the second predetermined range, the processor 330 may display the event with the first predetermined transmittance of the transparent member and the first predetermined output luminance of the projector, in operation 960. When the remaining capacity of the battery falls within the first predetermined range, the processor 330 may display the event without changing the output luminance of the projector and the transmittance of the transparent member. When the remaining capacity of the battery falls within the first predetermined range, the processor 330 may display the event upon detection of the normal event as well as the predetermined event.

A wearable electronic device (e.g., the electronic device 101 of FIG. 1 or the electronic device 300 of FIG. 3) according to various embodiments includes a battery (e.g., the battery 189 of FIG. 1 or the battery 310 of FIG. 3), an illuminance sensor (e.g., the sensor module 176 of FIG. 1) configured to measure a brightness of an outside of the wearable electronic device, a transparent member through which light incident from the outside passes, a light adjustment member disposed in at least a part of the transparent member and adjusting a transmittance with respect to the incident light, a projector (e.g., the light output device 280 of FIG. 2) configured to output an image through the transparent member, and a processor (e.g., the processor 120 of FIG. 1 or the processor 330 of FIG. 3), in which the processor 120 is configured to measure a remaining capacity of the battery 189 and the brightness of the outside, to adjust the transmittance to a first predetermined transmittance and an output luminance of the projector 280 to a first predetermined luminance, based on the brightness, when the remaining capacity falls within a first predetermined range, and to adjust the transmittance to a second predetermined transmittance and the output luminance of the projector 280 to a second predetermined luminance that is less than the first predetermined luminance, based on the brightness, when the remaining capacity falls within a second predetermined range.

According to various embodiments, the light adjustment member may include a prism. According to various embodiments, when the brightness of the outside is changed in a state where the transmittance of the transparent member is adjusted to the second predetermined transmittance and the output luminance of the projector 280 is adjusted to a second predetermined luminance that is less than the first predetermined luminance, the processor 120 may change the second predetermined transmittance and the second predetermined luminance based on the changed brightness of the outside. According to various embodiments, the processor 120 may adjust the second predetermined transmittance of the transparent member to a third predetermined transmittance and the output luminance of the projector 280 to a third predetermined luminance that is greater than the second predetermined luminance, when the brightness of the outside is increased to a first threshold value or less. According to various embodiments, when the brightness of the outside is reduced to a second threshold value or less, the processor 120 may adjust the second predetermined transmittance of the transparent member to a fourth predetermined transmittance and the output luminance of the projector to a fourth predetermined luminance that is less than the second pre-determined luminance. According to various embodiments, when the brightness of the outside is increased to the first threshold value or greater, the processor 120 may adjust the transmittance to a fifth predetermined transmittance that is less than the third predetermined transmittance and the output luminance of the projector 280 to a fifth predetermined luminance that is greater than the third predetermined luminance, and gradually adjust the transmittance from the third predetermined transmittance to the fifth predetermined transmittance and the output luminance of the projector from the third predetermined luminance to the fifth d predetermined luminance. According to various embodiments, the processor 120 may identify an event associated with a particular position in the outside of the wearable electronic device, and provide at least one of position information or depth information corresponding to the particular position in a situation of the outside. According to various embodiments, the wearable electronic device 101 may further include the memory 130 storing at least one application, in which the processor 120 may be configured to identify a predetermined event associated with an application stored in the memory and to display information associated with the event through the projector and change the second predetermined transmittance and the second predetermined luminance, when the remaining capacity falls within the second predetermined range.

A method for controlling a wearable electronic device according to various embodiments includes measuring a remaining capacity of the battery 189 and measuring a brightness of an outside of the wearable electronic device 101 by using the illuminance sensor 176, adjusting a transmittance of a transparent member through which light incident from the outside of the wearable electronic device 101 passes to a first predetermined transmittance and an output luminance of the projector 280 to a first predetermined luminance, based on the brightness, when the remaining capacity falls within a first predetermined range, and adjusting the transmittance to a second predetermined transmittance and the output luminance of the projector 280 to a second predetermined luminance, based on the brightness, when the remaining capacity falls within a second predetermined range. According to various embodiments, the method may include changing, by the processor 120, the second predetermined transmittance and the second predetermined luminance based on the changed brightness of the outside, when the brightness of the outside is changed in a state where the transmittance of the transparent member is adjusted to the second predetermined transmittance and the output luminance of the projector is adjusted to a second predetermined luminance that is less than the first predetermined luminance.

According to various embodiments, the method may include adjusting the second predetermined transmittance to a third predetermined transmittance and the output luminance of the projector to a third predetermined luminance that is greater than the second predetermined luminance, when the brightness is increased to a first threshold value or less. According to various embodiments, the method may include adjusting the second predetermined transmittance of the transparent member to a fourth predetermined transmittance and the output luminance of the projector 280 to a fourth predetermined luminance that is less than the second predetermined luminance, when the brightness of the outside is reduced to a second threshold value or less. According to various embodiments, the method may include adjusting the transmittance to a fifth predetermined transmittance that is less than the third predetermined transmittance and the output luminance of the projector 280 to a fifth predetermined luminance that is greater than the third predetermined luminance, when the brightness of the outside is increased to the first threshold value or greater, and gradually adjusting the transmittance from the third predetermined transmittance to the fifth predetermined transmittance and the output luminance of the projector from the third predetermined luminance to the fifth predetermined luminance.

According to various embodiments, the method may include identifying an event associated with a particular position in the outside of the wearable electronic device, and providing at least one of position information or depth information corresponding to the particular position in a situation of the outside. According to various embodiments, the method may include identifying an event associated with the application stored in the memory 130 and displaying the information associated with the event through the projector and changing the second predetermined transmittance and the second predetermined luminance, when the remaining capacity falls within the second predetermined range.

In a non-transitory computer-readable recording medium having recorded thereon a program to be executed on a computer, the program includes executable instructions that cause, when executed by the processor 120, the processor 120 to measure a remaining capacity of the battery 189 and a brightness of an outside, to adjust a transmittance of a transparent member through which light incident from an outside of the wearable electronic device 101 passes to a first predetermined transmittance and an output luminance of the projector to a first predetermined luminance, based on the brightness, when the remaining capacity falls within a first predetermined range, and to adjust the transmittance to a second predetermined transmittance and the output luminance of the projector to a second predetermined luminance that is less than the first predetermined luminance, based on the brightness, when the remaining capacity falls within a second predetermined range.

According to various embodiments, when the brightness of the outside is changed in a state where the transmittance of the transparent member is adjusted to the second predetermined transmittance and the output luminance of the projector 280 is adjusted to a second predetermined luminance that is less than the first predetermined luminance, the processor 120 may change the second predetermined transmittance and the second predetermined luminance based on the changed brightness.

According to various embodiments, the processor 120 may adjust the transmittance to a fifth predetermined transmittance that is less than the third predetermined transmittance and the output luminance of the projector to a fifth predetermined luminance that is greater than the third predetermined luminance, when the brightness of the outside is increased to the first threshold value or greater, and gradually adjust the transmittance from the third predetermined transmittance to the fifth predetermined transmittance and the output luminance of the projector from the third predetermined luminance to the fifth predetermined luminance.

According to various embodiments, the processor 120 may identify an event associated with a particular position in the outside of the wearable electronic device, and provide at least one of position information or depth information corresponding to the particular position in a situation of the outside. According to various embodiments, the processor 120 may identify a predetermined event associated with an application stored in the memory 130 and display information associated with the event through the projector and change the second predetermined transmittance and the second predetermined luminance, when the remaining capacity falls within the second predetermined range.

An electronic device according to various embodiments may be one of various types of electronic devices, according to various embodiments of the present disclosure. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

A term "module" used herein may mean, for example, a unit including one of or a combination of two or more of hardware, software, and firmware, and may be used interchangeably with terms such as logic, a logic block, a part, or a circuit. The module may be a single integral component, or a minimum unit or part thereof, adapted to perform one or more functions. For example, the module may be implemented as an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). The machine may invoke stored instructions from the storage medium and operate according to the invoked instructions, and may include an electronic device (e.g., the electronic device 101) according to the disclosed embodiments. When the instructions are executed by a processor (for example, the processor 120), functions corresponding to the instructions may be performed directly by the processor or using other components under control of the processor. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and one or more of the above-described components may be omitted, or one or more other components may be added. Alternatively or additionally, a plurality of components (e.g., modules or programs) may be integrated into a single component, and the integrated component may still perform one or more functions of each of the plurality of components in the same or similar manner as they are performed by a corresponding one of the plurality of components before the integration. Operations performed by the module, the program, or another component according to various embodiments may be carried out sequentially, in parallel, repeatedly, or heuristically, or one or more of the operations may be executed in a different order or omitted, or one or more other operations may be added.

The invention claimed is:

1. A wearable electronic device comprising:
   a battery;
   an illuminance sensor configured to measure a brightness of an outside of the wearable electronic device;
   a transparent member through which light incident from the outside passes;
   a light adjustment member disposed in at least a part of the transparent member and adjusting a transmittance with respect to the incident light;
   a projector configured to output an image through the transparent member;
   a memory storing at least one application; and
   a processor configured to:
      measure a remaining capacity of the battery and the brightness of the outside;
      adjust the transmittance to a first predetermined transmittance and an output luminance of the projector to a first predetermined luminance, based on the brightness, when the remaining capacity falls within a first predetermined range;
      adjust the transmittance to a second predetermined transmittance and the output luminance of the projector to a second predetermined luminance that is less than the first predetermined luminance, based on the brightness, when the remaining capacity falls within a second predetermined range; and
      in case that a predetermined event associated with an application stored in the memory is identified, display information associated with the event through the projector and change the second predetermined transmittance and the second predetermined luminance, when the remaining capacity falls within the second predetermined range.

2. The wearable electronic device of claim 1, wherein the light adjustment member comprises a prism.

3. The wearable electronic device of claim 1, wherein when the brightness of the outside is changed in a state where the transmittance is adjusted to the second predetermined transmittance and the output luminance of the projector is adjusted to a second predetermined luminance that is less than the first predetermined luminance, the processor is configured to change the second predetermined transmittance and the second predetermined luminance based on the changed brightness of the outside.

4. The wearable electronic device of claim 3, wherein when the brightness of the outside is increased to a first threshold value or less, the processor is configured to adjust the second predetermined transmittance to a third predetermined transmittance and the output luminance of the projector to a third predetermined luminance that is greater than the second predetermined luminance.

5. The wearable electronic device of claim 4, wherein the processor is configured to:
   when the brightness of the outside is increased to the first threshold value or greater, adjust the transmittance to a fifth predetermined transmittance that is less than the third predetermined transmittance and the output luminance of the projector to a fifth predetermined luminance that is greater than the third predetermined luminance; and
   gradually adjust the transmittance from the third predetermined transmittance to the fifth predetermined transmittance and the output luminance of the projector from the third predetermined luminance to the fifth predetermined luminance.

6. The wearable electronic device of claim 3, wherein when the brightness of the outside is reduced to a second threshold value or less, the processor is configured to adjust the second predetermined transmittance to a fourth predetermined transmittance and the output luminance of the projector to a fourth predetermined luminance that is less than the second predetermined luminance.

7. The wearable electronic device of claim 1, wherein the processor is configured to:
   identify an event associated with a particular position in the outside of the wearable electronic device; and
   provide at least one of position information or depth information corresponding to the particular position in a situation of the outside.

8. A method for controlling a wearable electronic device, the method comprising:
   measuring a remaining capacity of a battery and measuring a brightness of an outside of the wearable electronic device;
   adjusting a transmittance of a transparent member through which light incident from the outside passes to a first predetermined transmittance and an output luminance of a projector to a first predetermined luminance, based on the brightness, when the remaining capacity falls within a first predetermined range;
   adjusting the transmittance to a second predetermined transmittance and the output luminance of the projector to a second predetermined luminance, based on the brightness, when the remaining capacity falls within a second predetermined range; and
   in case that a predetermined event associated with an application stored in a memory is identified, displaying information associated with the event through the projector and changing the second predetermined transmittance and the second predetermined luminance, when the remaining capacity falls within the second predetermined range.

9. The method of claim 8, further comprising changing the second predetermined transmittance and the second predetermined luminance based on the changed brightness, when the brightness is changed in a state where the transmittance is adjusted to the second predetermined transmittance and the output luminance of the projector is adjusted to a second predetermined luminance that is less than the first predetermined luminance.

10. The method of claim 9, further comprising:
adjusting the second predetermined transmittance to a third predetermined transmittance and the output luminance of the projector to a third predetermined luminance that is greater than the second predetermined luminance, when the brightness of the outside is increased to a first threshold value or less; and
adjusting the second predetermined transmittance to a fourth predetermined transmittance and the output luminance of the projector to a fourth predetermined luminance that is less than the second predetermined luminance, when the brightness of the outside is reduced to a second threshold value or less.

11. The method of claim 10, further comprising:
adjusting the transmittance to a fifth predetermined transmittance that is less than the third predetermined transmittance and the output luminance of the projector to a fifth predetermined luminance that is greater than the third predetermined luminance, when the brightness of the outside is increased to a first threshold value or greater; and
gradually adjusting the transmittance from the third predetermined transmittance to the fifth predetermined transmittance and the output luminance of the projector from the third predetermined luminance to the fifth predetermined luminance.

12. The method of claim 8, further comprising:
identifying an event associated with a particular position in the outside of the wearable electronic device; and
providing at least one of position information or depth information corresponding to the particular position in a situation of the outside.

13. A non-transitory computer-readable recording medium having recorded thereon a program to be executed on a computer, wherein the program comprises executable instructions that cause, when executed by a processor, the processor to:
measure a remaining capacity of a battery and a brightness of an outside;
adjust a transmittance of a transparent member through which light incident from an outside of a wearable electronic device passes to a first predetermined transmittance and an output luminance of a projector to a first predetermined luminance, based on the brightness, when the remaining capacity falls within a first predetermined range;
adjust the transmittance to a second predetermined transmittance and the output luminance of the projector to a second predetermined luminance that is less than the first predetermined luminance, based on the brightness, when the remaining capacity falls within a second predetermined range; and
in case that a predetermined event associated with an application stored in a memory is identified, display information associated with the event through the projector and change the second predetermined transmittance and the second predetermined luminance, when the remaining capacity falls within the second predetermined range.

* * * * *